United States Patent [19]

Tsukamoto et al.

[11] Patent Number: 5,085,948
[45] Date of Patent: Feb. 4, 1992

[54] ALKALI METAL THERMOELECTRIC POWER GENERATOR

[75] Inventors: Moriaki Tsukamoto, Ibaraki; Hisamichi Inoue, Takahagi, both of Japan

[73] Assignee: Hitachi, Ltd., Tokyo, Japan

[21] Appl. No.: 647,413

[22] Filed: Jan. 29, 1991

[30] Foreign Application Priority Data

Feb. 13, 1990 [JP] Japan .................................. 2-029602

[51] Int. Cl.$^5$ ........................................... H01M 10/39
[52] U.S. Cl. ........................................ 429/11; 429/104
[58] Field of Search ............... 429/104, 110, 112, 120, 429/11

[56] References Cited

U.S. PATENT DOCUMENTS 3,535,163  10/1970  Dzieciuch et al. .................. 429/104
4,857,421  8/1989   Ernst .................................... 429/104
4,868,072  9/1989   Abbin et al. ........................... 429/11

OTHER PUBLICATIONS

Hunt et al., Research and Development Program on a Sodium Heat Engine, Oct. 1982, U.S. Dept. of Energy Contract No. DE-AC02-79ER10347.
Novak et al., Development of a IKWE Sodium Heat Engine, pp. 220, 223 and 224.
Seivers et al., Radioisotope Powered Alkali Metal Thermoelectric Converter Design for Space Systems, 1988 IECEC Proceedings, vol. 3, pp. 159-167.

Primary Examiner—Anthony Skapars
Attorney, Agent, or Firm—Antonelli, Terry, Stout & Kraus

[57] ABSTRACT

Disclosed is an alkali metal thermoelectric power generator comprising a plurality of thermoelectric converters, which are connected in electrical series to one another by an external electronic conductor device, each of the converters converting thermal energy into electrical energy by utilizing the phenomenon that an alkali metal, arranged on each side of a solid electrolyte, diffuses across the electrolyte if the density thereof on one side of the electrolyte differs from that on the other side of the same. The generator further comprises a piping consisting of a plurality of connection pipes for returning the alkali metal condensed in a second spatial region of each thermoelectric converter to a first spatial region thereof through a common pump. Further, the respective open ends of the connection pipes, which connect the respective first regions of the converters to one another, are positioned in those portions of the respective first regions where only the vapor phase alkali metal exists.

14 Claims, 4 Drawing Sheets

ALKALI METAL THERMOELECTRIC POWER GENERATOR

BACKGROUND OF THE INVENTION

This invention relates to an alkali metal thermoelectric power generator which electrochemically converts thermal energy to electrical energy by means of alkali metal thermoelectric converters each using an alkali metal such as sodium or potassium and a solid electrolyte.

In an alkali metal thermoelectric converter (hereinafter referred to as "AMTEC"), an alkali metal is caused to move from a region on one side of a solid electrolyte to a region on the other side thereof by making use of the difference between the alkali metal density of each of the regions arranged respectively on each side of the solid electrolyte, thereby obtaining electrical energy. The basic construction of an AMTEC is disclosed in JP-B1-47-6660 and U.S. Pat. No. 3,535,163. In order to facilitate an understanding of the present invention, the principle of power generation on which the AMTEC is based will be schematically described below.

The AMTEC includes a power generator section, which is composed of a high temperature region (the first region) and a low temperature region (the second region), both being closed regions. The first and second regions are separated from each other by a solid electrolyte partition, which consists of beta ($\beta$)-alumina ($Na_2O.11Al_2O_3$), beta" ($\beta''$)-alumina or the like. The AMTEC is operated by heating the first region thereof. In the first region, sodium is heated to a temperature ranging from 900K to 1300K (the saturated vapor pressure thereof is in the range of $5 \times 10^3$ to $3 \times 10^5$ Pa) and exists in a vapor-liquid coexistent condition. The second region is a degassed vacuum chamber and includes a porous electrode which is in contact with the solid electrolyte partition and a condenser bordering on the vacuum chamber and facing the porous electrode. The condenser is cooled down to a temperature in the range of 400 to 800K. The sodium vapor pressure corresponding to the temperature of this condenser is in the range of $2 \times 10^{-4}$ to $1 \times 10^2$ Pa The solid electrolyte (beta"-alumina in this case) exhibits ionic conductivity for the ions of an alkali metal (sodium in this case) but acts as an insulator for electrons. The high temperature sodium in the first region discharges electrons on one surface of the solid electrolyte, and the sodium ions are driven by the difference between the sodium density of the first and second regions, respectively, and pass through the solid electrolyte, reaching other surface of the solid electrolyte which faces the condenser. Meanwhile, the electrons, having moved from the liquid sodium in the first region via an external electric circuit, neutralize the sodium ions at the interface between the solid electrolyte and the porous electrode adjacent thereto. The neutralized sodium absorbs heat of vaporization while it is being diffused within the porous electrode and is evaporated in the vacuum chamber. The vapor phase sodium in the vacuum chamber condenses in the condenser at a low temperature. The liquid phase sodium generated through this condensation is returned to the first region by a pump. To summarize the above description, the difference between the sodium density of each of the regions provided respectively on each side of the solid electrolyte serves as the driving force for the sodium ions in the solid electrolyte, electrical power being generated through the movement of the ions. This power generation is effected as an endothermic reaction. The requisite heat for the power generation is supplied by heating the first region, and, to maintain the temperature difference between the condenser, which is in the second region, and the first region, while the condenser is cooled.

Figure 5:
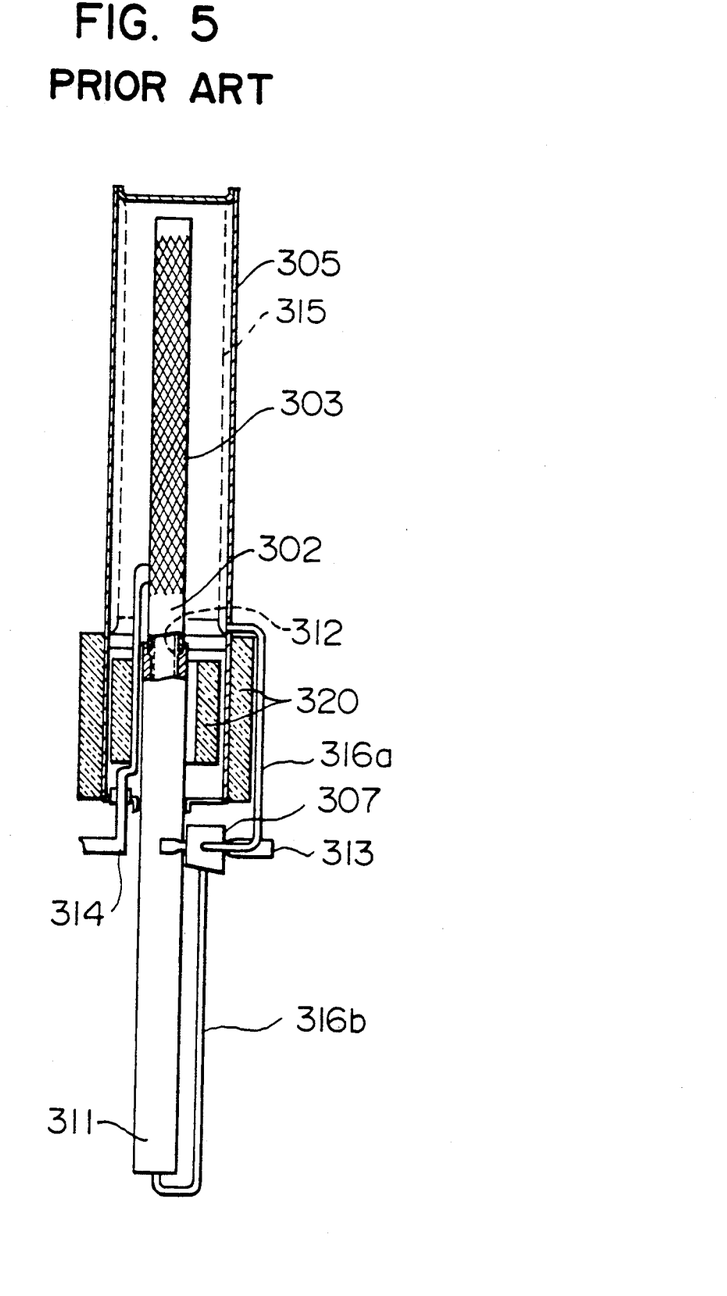
FIG. 5 is a partially cutaway view of an alkali metal thermoelectric power generator which constitutes prior art to this invention.

Generally speaking, in the AMTEC, as in other types of power generation systems, the higher the temperature on the high temperature side, the higher is the power generation efficiency that results, assuming that the temperature on the low temperature side is kept constant. Accordingly, it is necessary to set the temperature in the first region, and in particular, the temperature of the solid electrolyte, as uniformly high as the heat resistance of the components of the first region, i.e., the solid electrolyte, etc. permits. A method of effecting such a temperature setting is disclosed in "Radioisotope Powered Alkali Metal Thermoelectric Converter Design for Space System" by R. K. Sievers, et al., 1988 IECEC Proceeedings, Vol. 3, pp. 159-167 (1988). The above paper discloses an AMTEC structure in which heat is supplied by utilizing the principle of a heat pipe (hereinafter, this AMTEC will be referred to as "heat pipe type AMTEC or thermoelectric converter"). FIG. 5 shows the essential part of this structure. The AMTEC shown in FIG. 5 has a tubular body with one end open which includes an evaporator 311, and a solid electrolyte tube 302, which is also a tubular body with one end open. The inner space of the tubular body formed by connecting the respective open ends of these tubes with each other constitutes the first region serving as the high temperature region. This AMTEC also has a condenser shell 305, which is formed as a tubular body having a diameter sufficiently larger than that of the above-mentioned tubular body and which houses the solid electrolyte tube 302 with a sufficient clearance therebetween, and a porous electrode 303, which covers the outer periphery of the solid electrolyte tube 302. The space defined between the condenser shell 305 and the porous electrode 303 constitutes the second region. The inner peripheral surface of the above-mentioned tubular body which defines the first region is lined with a wick 312. The thermal energy from a heat source is added to the evaporator 311. The sodium evaporated by this thermal energy moves to the region of the solid electrolyte tube 302 and condenses on its inner surface, thereby imparting thermal energy to the solid electrolyte tube 302. A major part of the sodium that has condensed is returned to the evaporator 311 through the wick 312. The remaining sodium passes across the wall of the solid electrolyte tube as positive ions. The electrons inside the solid electrolyte tube 302 move via the wick 312 filled with sodium, the evaporator 311, etc. and are extracted through a cathode 313 provided in an electromagnetic pump 307. These electrons are conducted through an external circuit and an anode 314 to be returned to the porous electrode 303 provided on the outer peripheral surface of the solid electrolyte tube 302. The sodium ions passing through the solid electrolyte tube 302 are recombined with the electrons at the interface between the solid electrolyte tube 302 and the porous electrode 303. The sodium that is thereby neutralized absorbs heat of vaporization from the porous electrode 303 while diffusing within this electrode. This vapor phase sodium condenses on a wick 315 which is provided along the inner surface of the condenser shell 305. The condensed sodium is conducted via this wick 315 and a sodium return line 316a and is returned to the inlet of the electromagnetic pump 307. This electromagnetic pump 307 overcomes the pressure difference between the first and second regions and returns the sodium through a sodium return line 316b to the evaporator 311, thereby continuing the operation of the AMTEC. In this AMTEC, the first region acts as a heat pipe, so that the temperature gradient in the first region is small. The reference numeral 320 in the drawing indicates foil insulators for reducing the radiation heat loss from the AMTEC.

The inventors of the present invention examined and evaluated the AMTEC shown in FIG. 5 as follows:

The output density of the AMTEC is approximately 0.5 W/cm$^2$ or so per unit area of the solid electrode and its output voltage is 0.7 V at most. Thus, to obtain an electrical power output of 1 kWe with a single AMTEC, it is necessary to extract a large electric current of approximately 1400A, so that, even when using copper, which is a good conductor, it is necessary to prepare a very thick conductor whose diameter is approximately 1 cm or more as well as a power converter for substantially augmenting voltage. Therefore, in actual practical use, a number of relatively small thermoelectric converters have to be connected in series to one another. However, in connecting a large number of heat-pipe-type thermoelectric converters in series to one another, the following technical problems remain to be solved:

(1) To attain certain improvements, such as reducing weight, simplifying the system configuration, or reducing cost, a plurality of thermoelectric converters have to be managed with a common pump. When using heat-pipe-type AMTECs, it is necessary to provide vapor space in the respective first regions thereof and to supply sodium at flow rates corresponding to the respective generation outputs of the thermoelectric converters. Otherwise, an excess or deficiency in the sodium amount in the first regions would occur, thereby hindering the power generation.

(2) To enhance the power generation efficiency of the entire system, it is necessary to diminish the temperature difference between the respective first regions of the thermoelectric converters. For this purpose, it is necessary to equalize the respective temperatures of the heat sources or effect heat exchange between the thermoelectric converters. Generally speaking, however, it is difficult to equalize the respective temperatures of the heat sources. This is particularly true of heat sources utilizing solar energy condensed by a lens, a reflector or the like, since such heat sources involve an incident energy difference per unit area between the respective heat collector sections of the thermoelectric converters. Further, no method has been previously reported of efficiently effecting heat exchange between the thermoelectric converters while retaining the electrical insulation between the respective first regions of the thermoelectric converters. To electrically connect thermoelectric converters in series to one another, the bypass electrical resistance between the thermoelectric converters must be greater by at least two digits than the internal resistance of the thermoelectric converters.

SUMMARY OF THE INVENTION

It is accordingly an object of the present invention to provide an alkali metal thermoelectric power generator comprising a number of heat-pipe-type thermoelectric converters which are connected in series to one another, wherein the heat-pipe-type thermoelectric converters are supplied with sodium by a common pump at flow rates corresponding to their respective power generation outputs, and wherein the temperature difference between the respective first regions of the thermoelectric converters is kept small.

In accordance with this invention, the above object is achieved by an alkali metal thermoelectric power generator of the type using thermoelectric converters which convert thermal energy to electrical energy by utilizing the phenomenon that an alkali metal provided in two spatial regions which are respectively arranged on each side of a solid electrolyte diffuses across this solid electrolyte if the alkali metal density of one region differs from that of the other region, each of the thermoelectric converters including: first shell members which define a first spatial region in the form of an airtight chamber and a part of which is formed of a solid electrolyte exhibiting an ionic conductivity; a second shell member which defines a second spatial region in the form of an airtight chamber and which includes that portion of the above-mentioned first shell members which is formed of a solid electrolyte as a common partition (i.e., as a partition separating the two spatial regions from each other); an alkali metal which is in contact with the partition made of a solid electrolyte in the first spatial region and which exists in a vapor-liquid coexistent condition when the power generator is in operation; a porous electrode which is provided in the second spatial region in such a manner as to be in electrical contact with the partition and as to cover the partition and which has a sufficient number of pores to allow passage of the alkali metal; an external electron condcutor means which conductively connects the alkali metal in the first spatial region to the porous electrode; a first means exhibiting capillarity which is provided in the first spatial region along the surface of the first shell members; a second means exhibiting capillarity which is provided in the second spatial region along the surface of the second shell member except for that portion thereof which is formed of a solid electrolyte; and a heating means which heats the first spatial region so as to keep the temperature of the first spatial region to be higher than that of the second spatial region; the alkali metal thermoelectric power generator comprising:

a plurality of thermoelectric converters which are connected in electrical series to one another by the external electronic conductor means; a piping for returning the alkali metal condensed in the respective second spatial regions of the thermoelectric converters to the respective first regions of the thermoelectric converters by way of a common pump; and a connection piping which consists of a plurality of connection pipes which connect the respective first spatial regions of the thermoelectric converters to one another in such a manner as to allow them to communicate with one another, the respective open ends of the connection pipes being positioned in those zones of the respective first spatial regions where only the vapor phase alkali metal exists.

In the thermoelectric power generator of this invention, the external conductor means (the electrodes) of a plurality of thermoelectric converters are connected in series to one another, and the alkali metal condensed in the respective second spatial regions of the thermoelectric converters is returned to capillary means provided in the respective first spatial regions by way of a common pump. Further, the respective first spatial regions of the thermoelectric converters are connected to one another by means of connection pipes, the respective open ends of the connection pipes being positioned in those zones of the respective first spatial regions of the thermoelectric converters where only the vapor phase alkali metal exists.

In the present invention, the temperature difference between the first spatial region, constituting the high temeprature region, and the second spatial region, constituting the low temperature region, is kept to be large, which is effective in enhancing the power generation efficiency. In view of this, it is effective to cool the second spatial region in a forced manner while heating the first spatial region.

"The first means which exhibits capillarity and which is provided in the first spatial region along the surface of the first shell members" is usually in the form of a wick consisting of a heat resistant net. Examples of a wick to be recommended include, for example, an Inconel-alloy net, a net made of an austenitic stainless steel (JIS SUS 304) (one whose mesh size, i.e., pore radius, is, for example, 0.003 cm), and a foam nickel (e.g., CELMET (manufactured by Sumitomo Electric Industries, Ltd.)). The first means may also be prepared by forming on the surface of the first shell members a multitude of thin grooves which exhibit capillarity. This also applies to the second means which exhibits capillarity in the second spatial region. The capillarity pressure of the second means is preferably made smaller than that of the first means.

The porous electrode which is provided in the second spatial region in such a manner as to be in electrical contact with the partition and as to cover the partition and which has a sufficient number of pores to allow passage of the alkali metal is obtained by, for example, forming a thin film of molybdenum by sputtering on the surface of the partition, or forming a thin film of titanium nitride by ion plating. Such a thin film has a multitude of micron level through-pores, so that they allow passage of the alkali metal. The thickness of this film is so small, that it exhibits high electrical resistance. In view of this, it is to be recommended to cover the surface of this thin film with a net member formed of a good conductor. The terminal of the external electronic conductor means is connected to this net by simply bringing them into contact with each other or welding them together.

This thermoelectric power generator, constructed as described above, operates in the following manner:

a) The heating of the first spatial region of each thermoelectric converter is effected on the shell members defining this first spatial region. While the thermoelectric power generator is being operated through this heating, the alkali metal in the first spatial region is in a vapor-liquid coexistent state. That is, the wick in the first spatial region retains the liquid alkali metal. This liquid alkali metal is continuously evaporated by the heating, its vapor permeating the first spatial region. A continuous supply of liquid alkali metal to the wick in the first spatial region is effected by returning the alkali metal condensed in the second spatial region to the first spatial region by way of the pump.

b) The vapor alkali metal in the first spatial region of each thermoelectric converter condenses on the common partition which separates the first and second spatial regions from each other and which is made of a solid electrolyte such as beta-alumina or beta"-alumina, and adheres to this common partition. This high temperature alkali metal, which has thus condensed on and adhered to the common partition, discharges electrons on the surface of the common partition, and the ions of the alkali metal are driven by the density difference between the first and second spatial regions to pass through the common partition, reaching that surface of the common partition which is on the side of the second spatial region. Meanwhile, the electrons, which have moved from the liquid alkali metal in the first spatial region by way of the external electric circuit, neutralize the ions of the alkali metal at the interface between the solid electrolyte common partition and the porous electrode adjacent thereto. The alkali metal thus neutralized absorbs heat of vaporization from the porous electrode while diffusing within it and is evaporated into the second spatial region, which is a vacuum chamber. The alkali metal vapor in the second spatial region condenses on the surface of the low temperature shell member facing the porous electrode and adheres to it.

c) The alkali metal that has condensed in the respective second spatial regions of the thermoelectric converters is returned to the means exhibiting capillarity in the respective first spatial regions by way of the common pump. The force of the pump acting on the sodium at this time is equal to the sum of the delivery pressure of the pump and the capillarity pressure of the means exhibiting capillarity in the respective first spatial regions. The capilalrity pressure has no effect when the means exhibiting capillarity is sufficiently filled with sodium; it is active only when the means exhibiting capillarity is not filled with sodium to a sufficient degree. Thus, if there is a difference between, for example, the respective outputs of the thermoelectric converters or the flow resistances in the respective return lines, the capillarity pressure is active in such a manner that the means exhibiting capillarity are constantly filled with sodium, so that an excess or deficiency in the respective sodium amounts in the thermoelectric converters can be avoided although the returning of the sodium is effected by a common pump.

Further, since the sodium amount required by the return pipe, which is on the delivery side of the pump, is small, this pipe may be made sufficiently thin (its inner diameter may, for example, be 1 mm). In this way, its electrical resistance can be easily made about one hundred times greater than the internal resistance of the thermoelectric converter. This implies that the loss current (the bypass current) that flows through the respective return pipes when the electrodes of the thermoelectric converters are connected in series to one another can be reduced to a negligible degree.

d) If there is a difference between the thermal inputs to the individual thermoelectric converters, as in the case where condensed solar energy is utilized, the temperature and pressure in the first spatial region of a thermoelectric converter receiving a relatively large thermal input (hereinafter referred to as "Converter No. 1") are higher than those of a thermoelectric converter receiving a relatively small thermal input (hereinafter referred to as "Converter No. 2"). Therefore, the vapor sodium in the high temperature region of Converter No. 1 moves through the connection piping and condenses in the first spatial region of Converter No. 2, thus transferring heat and equalizing the respective temepratures of the converters. This action causes the sodium amount in the first spatial region of Converter No. 1 to decrease and that of Converter No. 2 to increase. At this time, the respective open ends of the pipes constituting the connection piping are positioned in those zones of the respective first spatial regions where only the vapor-phase sodium exists, so that only vapor sodium passes through the connection piping. If this connection piping is made of metal, the bypass current flowing therethrough can be made small by making its diameter and thickness small. Further, by forming at least a part of each of the connection pipes constituting the connection piping of an insulating material over the entire periphery thereof, the respective first spatial regions of the thermoelectric converters can be prevented from being conductively connected to one another through the connection piping.

When in Converter No. 2 the sodium amount increases to such an extent that it exceeds the requisite amount for filling the means exhibiting capillarity in the first spatial region thereof, the capillarity pressure which has been acting on the outlet of the sodium return pipe leading to the first spatial region disappears. As a result, the sodium supply capacity is diminished and the sodium supply to Converter No. 2 is suppressed, whereas, in Converter No. 1, in which the liquid sodium in the first spatial region has decreased, the capillary force is active and the sodium supply from the pump is increased. Therefore, the sodium in the first spatial region of Converter No. 1 is not exhausted. Thus, the respective temperatures of the thermoelectric converters can be equalized.

Other features of the present invention will be apparent from the following description of the preferred embodiments taken in connection with the accompanying drawings.

DESCRIPTION OF THE PREFERRED EMBODIMENTS

Embodiment 1

Figure 1:
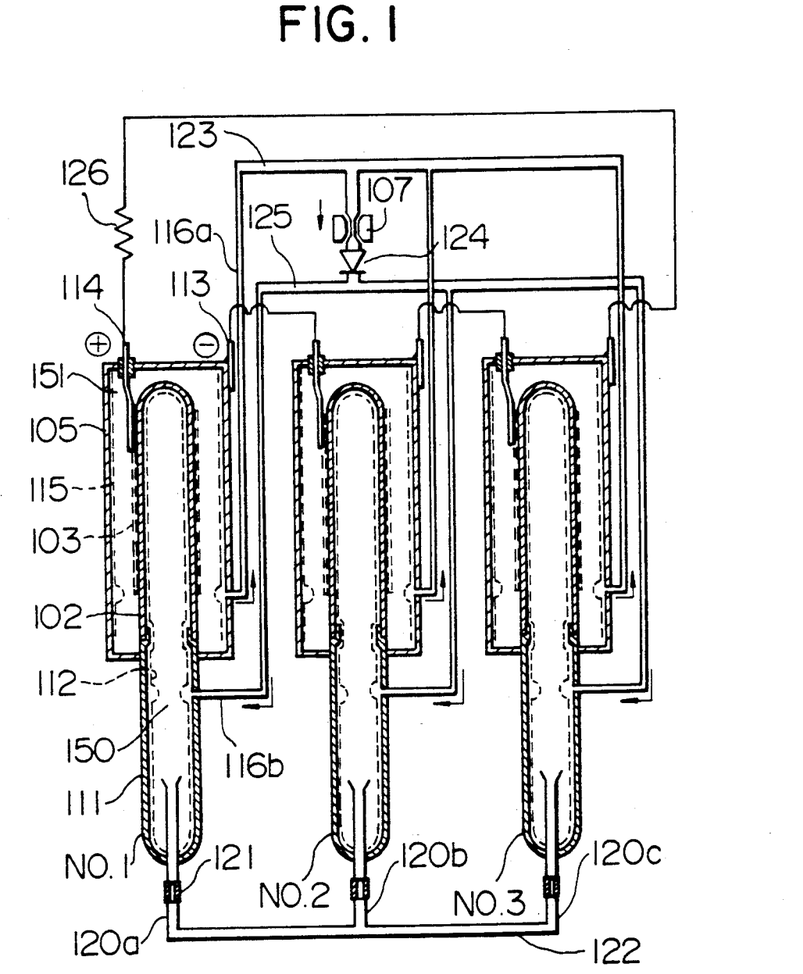
FIG. 1 is a conceptual sectional view of an alkali metal thermoelectric power generator in accordance with an embodiment of the present invention.

FIG. 1 is a schematic view showing an alkali metal thermoelectric power generator in accordance with an embodiment of this invention, in which three thermoelectric converters, Converters No. 1, No. 2, and No. 3, are connected in electrical series to one another. The sodium in these thermoelectric converters is caused to circulate by a common pump 107. At the same time, these thermoelectric converters are thermally connected to one another through connection pipes 120a, 120b, 120c, etc.

The structure of the thermoelectric converters shown in FIG. 1 will be described in connection with Converter No. 1. Referring to FIG. 1, the open end of an evaporator 111, which is in the form of a tubular body with one end open that is formed of metal, and the open end of a solid electrolyte tube 102, which is also in the form of a tubular body with one end open, are connected to each other to define a first region 150 on the inside. A porous electrode 103 having a sufficient number of pores to allow passage of sodium is provided on the outer surface of the solid electrolyte tube 102 in such a manner as to be in electrical contact with it. An anode 114, which is in electrical contact with this porous electrode 103, extends through a condenser shell 105 to the exterior while being electrically insulated therefrom. Provided on the inner surface of the solid electrolyte 102 is a first wick 112 made of a foam nickel with pores, stainless steel mesh or the like (having a pore radius, for example, of 0.003 cm). The pores in the wick 112 is approx. 100% filled with liquid sodium, and this liquid sodium is in contact with the inner surfaces of the solid electrolyte tube 102 and the evaporator 111. Attached to the outer periphery of the evaporator 111 is a metal condenser shell 105 in the form of a tubular body with one end open, which defines a second region 151. Provided on the inner surface of the condenser shell 105 is a second wick 115, whose pore radius is greater than that of the first wick 112 by not less than a digit. The second wick 115 does not necessarily have to be filled with liquid sodium. A cathode 113 is provided on the outer surface of the condenser shell 105 in such a manner as to be in electrical contact therewith. The condenser shell 105 is provided with a sodium extraction pipe 116a, and the evaporator 111 is provided with a sodium return pipe 116b and a connection pipe 120a. The open end of the connection pipe 120a is situated in the space zone of the first region 150, and at least a part of that section of the connection pipe 120a which is outside the first region 150 consists of an electrically insulating pipe section 121.

The respective sodium extraction pipes of the three thermoelectric converters No. 1 to No. 3, each constructed as described above, are connected to the respective sodium return pipes through a pump inlet header 123, a common pump 107, a common check valve 124, and a pump outlet header 125. Further, the respective connection pipes 120a, 120b, and 120c of these thermoelectric converters are connected to one another through a connection pipe header 122. These thermoelectric converters are connected in electrical series to one another, and the electric circuit thus formed includes a power load 126.

The basic operation of these thermoelectric converters is substantially identical to that of the conventional heat-pipe-type AMTEC shown in FIG. 5, so that the following description of their basic operation will be focused on those points which constitute the features of the power generator of the present invention. In order to simplify the description, it will be assumed in the following that the power generator of this invention is operated in an environment where gravity can be neglected as in space. This, however, should not be construed as restrictive to the effects of this invention under gravitation.

As shown in FIG. 1, the thermoelectric power generator of this invention is composed of a plurality of thermoelectric converters connected in series to one another. Sodium is condensed in the respective second regions of these thermoelectric converters and is returned to the respective first regions thereof by the common pump 107. The pumping force acting on the sodium at this time consists of the pressure obtained by subtracting the sodium vapor pressure in the respective first regions (e.g., 125,000 Pa at 1175K) from the sum of the delivery pressure of the pump 107 (e.g., 130,000 Pa) and the capillarity pressure of the respective first wicks 112 of the thermoelectric converters (e.g., approx. 7500 Pa when the pore radius is 0.003 cm). Here, the sodium vapor pressure in the respective second regions is neglected since it is very low. Further, the capillarity pressure of the second wicks 115 is also neglected since their pore radius is larger than that of the first wicks by not less than a digit. The capillarity pressure is not active when the wicks are filled with sodium to a sufficient degree, and is active when they are not filled with sodium sufficiently. Accordingly, if the respective outputs of the thermoelectric converters, the flow resistances in the respective return pipes, etc. are not uniform, the capillarity pressure acts in such a manner that those of the respective first wicks which are filled with sodium to a smaller degree are supplied with more sodium, so that an excess or deficiency in the respective sodium amounts of the thermoelectric converters can be avoided even though the returning of the sodium in these thermoelectric converters is effected by a common pump.

The respective sodium extraction pipes 116a and the respective sodium return pipes 116b of the thermoelectric converters need a relatively low flow rate (e.g., approx. 50 mg/s when the output of the thermoelectric converters is 100 W), so that they can be made sufficiently thin (their inner diameter may, for example, be 1 mm). Thus, it is easy to make their electrical resistance approx. one hundred times greater than the internal resistance of the thermoelectric converters (which ranges from 1 to 2 m$\Omega$ in the case of 100 W converters). Therefore, the loss currents (the bypass currents), which flow through the sodium extraction pipes 116a and the sodium return pipes 116b when the respective electrodes of the thermoelectric converters are connected in series to one another, can be reduced to a negligible degree, so that the provision of a common pump does not result in deterioration in the power generation efficiency.

The respective first regions 150 of the thermoelectric converters are connected to one another by the connection pipes 120a, etc., and the respective open ends of the connection pipes are positioned in the respective inner spaces of the first regions. This arrangement provides the following effect.

If the respective thermal inputs to the individual thermoelectric converters differ from one another, as in the case where condensed solar energy is utilized, the temperature and pressure in the first region 150 of a thermoelectric converter which receives a relatively large thermal input (e.g., Converter No. 1) become higher than those of a thermoelectric converter which receives a relatively small thermal input (e.g., Converter No. 2). As a result, some of the vapor sodium in the high temperature region of Converter No. 1 is conducted through the connection pipe 120a and the connection pipe header 122 and condenses in the first region of Converter No. 2, thereby trnasferring heat and effecting temperature equalization.

This action causes the sodium amount in the first region of Converter No. 1 to decrease and that of Converter No. 2 to increase. When the liquid sodium in Converter No. 2 has been augmented to such an extent as to exceed the amount needed for the 100% filling of the first wick of the converter, the capillarity pressure that has been acting on the sodium return pipe disappears. In Converter No. 1, on the other hand, the liquid sodium in the first wick 112 decreases, so that the capillarity pressure is active. Accordingly, the sodium supply to the first region 150 of Converter No. 1 from the pump 107 increases, and, at the same time, sodium is also supplied thereto from the first region of Converter No. 2 via the pump outlet header 125. Therefore, the respective temperatures in the thermoelectric converters can be equalized without causing a deficiency in the amount of sodium liquid in the first region of a thermoelectric converter which receives a relatively large thermal input from the heat source.

Further, since the respective open ends of the connection pipes 120a, etc. are situated in the respective inner space zones of the first regions 150, it is only vapor sodium that pass through these connection pipes. Since vapor sodium has no electrical conductivity, the bypass currents flowing through the connection pipes can be reduced by making their diameter and thickness small even when they are formed of metal. Further, by forming at least a part of each connection pipe as a ring-like insulator, as indicated at 121, the respective first regions can be perfectly prevented from being conductively connected to one another through the connection pipes.

Next, the operation of the check valve 124, which is provided on the delivery side of the pump 107, will be described.

During normal operation of the power generator, this check valve 124 allows passage of the liquid sodium from the pump 107, supplying the respective first regions of the thermoelectric converters with liquid sodium. When the heat supply to the thermoelectric converters and the operation of the pump 107 are stopped in the non-operating state of the power generator, the check valve 124 is closed since the sodium pressure in the first regions 150 are higher than that in the second region 151. This causes the communication between the first and second regions to be cut off, so that there is no fear of the sodium in the first regions flowing back to the second regions even if the pump 107 is stopped. When the thermoelectric converters are heated at the start of the power generator, the sodium vapor pressure in the first regions becomes higher and enables the power generation to be quickly started since the communication between the first and the second regions is then blocked by the check valve 124.

Embodiment 2

Figure 2:
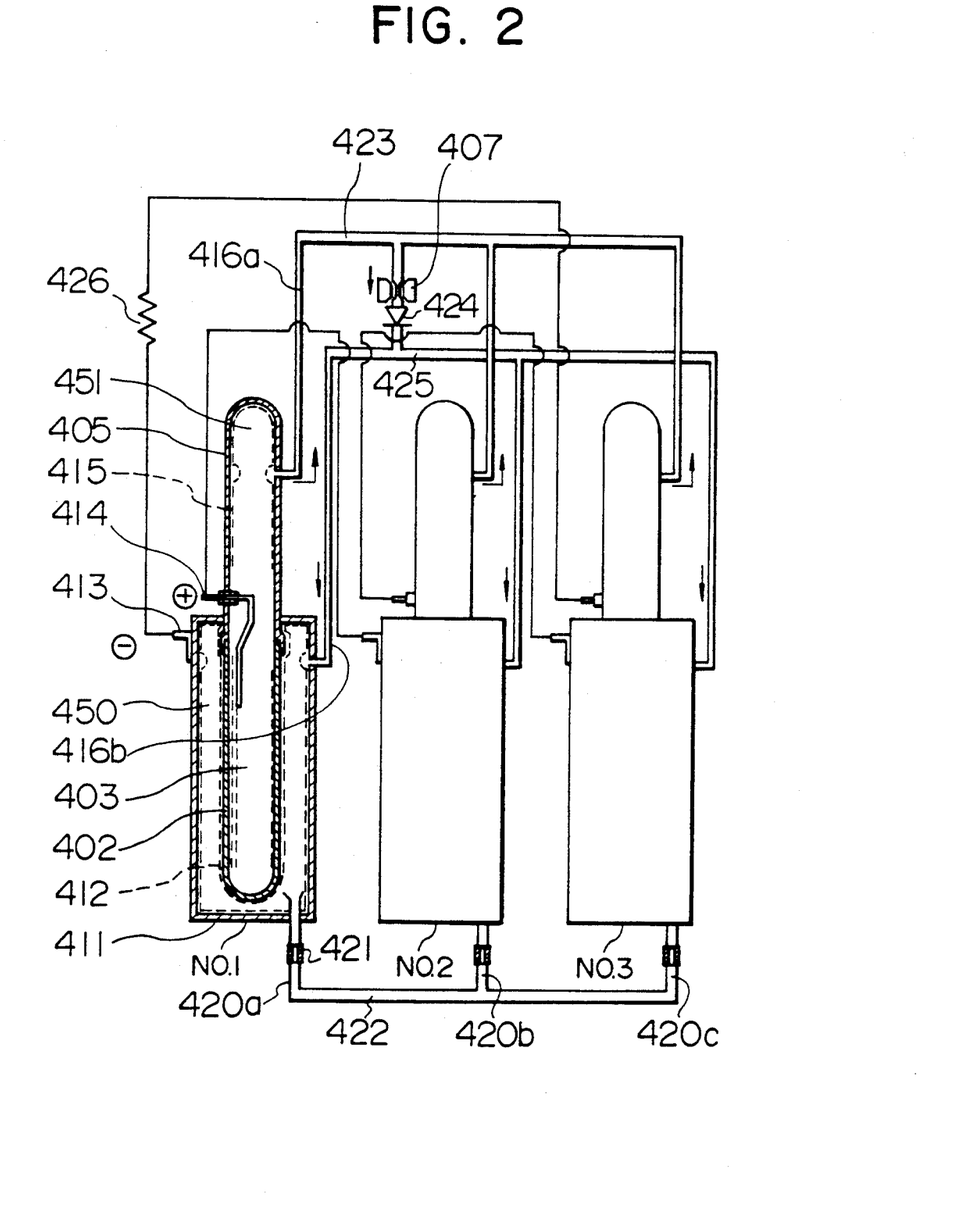
FIG. 2 is a schematic view of an alkali metal thermoelectric power generator in accordance with another embodiment of the present invention.

Another embodiment of the present invention will now be described with reference to FIG. 2. FIG. 2 is a schematic diagram showing the construction of an alkali metal thermoelectric power generator in which a plurality of (three in this example) thermoelectric converters whose structure is different from that of the thermoelectric converters shown in FIG. 1 are connected in electrical series.

The structure of these thermoelectric converters will be described in connection with Converter No. 1. Referring to FIG. 2, an evaporator 411, which is in the form of a metal tubular body with one end open, and a solid electrolyte 402, which is also in the form of a tubular body with one end open and whose diameter is smaller than that of the evaporator 411, are arranged in such a manner that their open ends are directed in the same way to form a substantially concentric duplex-tube structure, the respective open ends of these tubes being connected together. A first region 450 is defined between the evaporator 411 and the solid electrolyte 402 of this duplex-tube structure. A porous electrode 403 having a sufficient number of pores to allow passage of sodium is provided on the inner surface of the solid electrolyte tube 402 in such a manner as to be in electrical contact therewith. An anode 414, which is in electrical contact with this porous electrode 403, extends through a condenser shell 405 to the exterior while being electrically insulated therefrom. Further, provided on the outer surface of the solid electrolyte 402 is a first wick 412 consisting of a foam nickel with pores, stainless mesh, etc. (whose pore radius is, for example, 0.003 cm). The pores in the wick 412 are 100% filled with liquid sodium, and this liquid sodium is in contact with the solid electrolyte 402 and the evaporator 411.

The condenser shell 405, which is in the form of a metal tubular body with one end open, is connected to the condenser 411 in such a manner as to close the open end of the solid electrolyte tube 402, whereby a second region 451 is formed inside the solid electrolyte tube 402 and the condenser shell 405. Provided on the inner surface of the condenser shell 405 is a second wick 415 whose pore radius is larger than that of the first wick 412 by not less than one digit. This second wick 415 does not necessarily have to be filled with liquid sodium. A cathode 413 is provided on the outer surface of the evaporator 411 in such a manner as to be in electrical contact therewith. The condenser shell 405 is provided with a sodium extraction pipe 416a, and the evaporator 411 is provided with a sodium return pipe 416b and a connection pipe 420a. The open end of the connection pipe 420a is situated in the space zone of the first region 450, and at least a part of that portion of this connection pipe which is outside the first region consists of an electrically insulating pipe section 421.

Although the layout of the first and second regions in these thermoelectric converters is different from that in the thermoelectric converters shown in FIG. 1, there is no difference between these two layouts of thermoelectric converters in terms of their function. Thus, as in the example shown in FIG. 1, the respective sodium extraction pipes of Converters No. 1 to No. 3 are connected to the respective sodium return pipes through the pump inlet header 424, a common pump 407, a common check valve 424, and a pump outlet header 425. The respective connection pipes 420a, 420b, and 420c of these thermoelectric converters are connected to one another through a connection pipe header 422. Further, these thermoelectric converters are connected in electrical series, and the electric circuit they form includes a power load 426.

This embodiment provides an effect similar to that of the embodiment shown in FIG. 1.

Embodiment 3

Figure 3:
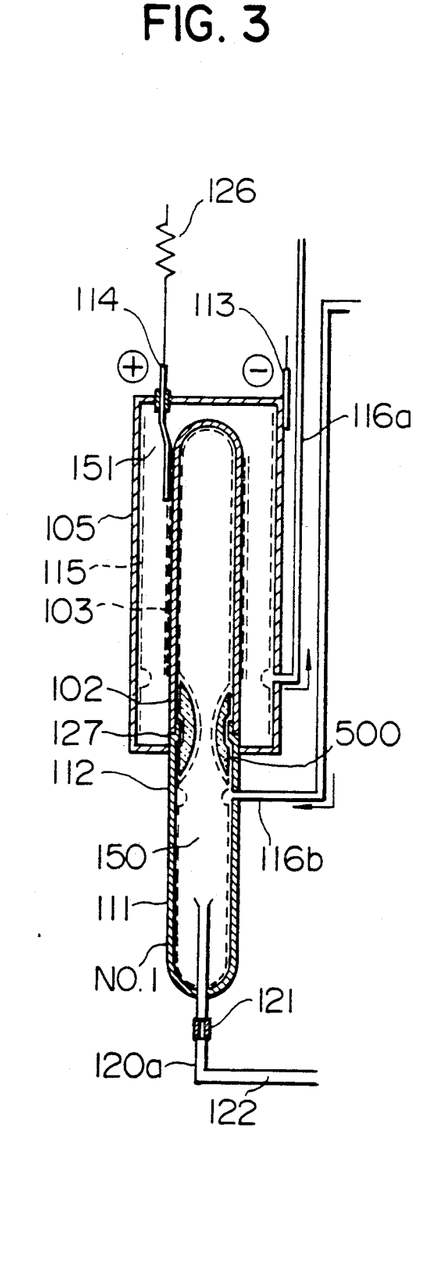
FIGS. 3 and 4 are sectional views of alkali metal thermoelectric converters in accordance with modifications of these embodiments.
Figure 4:
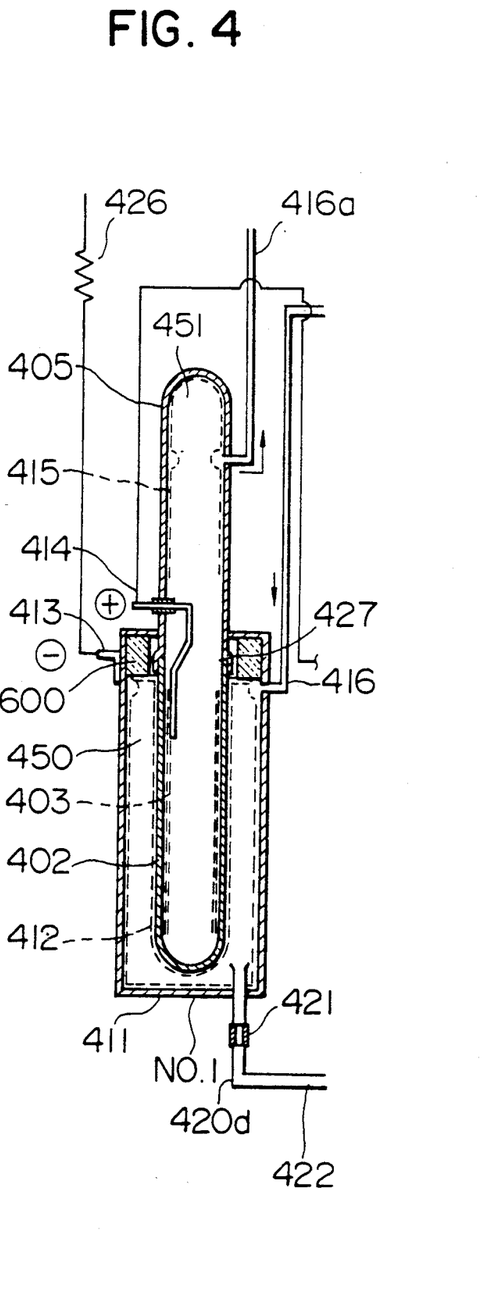

FIGS. 3 and 4 are schematic views showing thermoelectric converter structures suited for the power generator of this invention. In the thermoelectric converter shown in FIG. 3, which has a structure similar to that of the embodiment shown in FIG. 1, a heat insulating layer 500 is provided between a joint section 127, which joins the solid electrolyte tube 102 with the evaporator 111, and the first region 150. This heat insulating layer 500 preferably consists of a vacuum heat insulating layer formed by evacuating the inner space of a duplex tube formed of a heat resistant metal. In the thermoelectric converter shown in FIG. 4, which has a structure similar to that of the embodiment shown in FIG. 2, a heat insulating layer 600 is provided between a joint section 427, which joins the solid electrolyte tube 402 with the evaporator 411, and the first region 450.

By virtue of such a heat insulating layer, the temperature of the joint section can be made lower than that of the first region, so that, even if the maximum temperature that the joint section can withstand is lower than the temperature of the first region, the joint section can be protected from damage.

As will be apparent from the above, the present invention provides the following advantages: in a power generator in which a plurality of thermoelectric converters are connected in electrical series to one another, each thermoelectric converter can be supplied with sodium by a common pump whithout involving any excess or deficiency in the sodium amount even if the thermal input distribution, the flow resistance in the piping, the characteristics of the thermoelectric converters, etc. are not uniform. At the same time, the respective temperatures of the thermoelectric converters can be equalized. By virtue of these advantages, the power generator can be made lighter, and its power generation efficiency can be enhanced.

What is claimed is:

1. An alkali metal thermoelectric power generator of the type using a plurality of thermoelectric converters which convert thermal energy to electrical energy by utilizing the phenomenon that an alkali metal provided in two spatial regions which are arranged respectively on each side of a solid electrolyte diffuses across this solid electrolyte if the alkali metal density of one region is different from that of the other region, each of the thermoelectric converters including:

first shell members which define a first spatial region in the form of an airtight chamber and a part of which is formed of a solid electrolyte exhibiting an ionic conductivity for ions;

a second shell member which defines a second spatial region in the form of an airtight chamber and which includes that part of the first shell members which is formed of a solid electrolyte, as a common partition, an alkali metal which is in contact with the partition made of a solid electrolyte in the first spatial region and which is in a vapor-liquid coexistent state when the power generator is in operation;

a porous electrode which is provided in the second spatial region in such a manner as to be in electrical contact with the partition and as to cover the partition and which has a sufficient number of pores to allow passage of the alkali metal;

an external electron conductor means which conductively connects the alkali metal in the first spatial region to the porous electrode;

a first means exhibiting capillarity which is provided in the first spatial region along the surface of the first shell members;

a second means which is provided in the second spatial region along the surface of the second shell member except for that portion thereof which is formed of a solid electrolyte; and a heating means which heats the first spatial region so as to keep the temperature of the first spatial region to be higher than that of the second spatial region;

the alkali metal thermoelectric power generator comprising:

a plurality of thermoelectric converters which are connected in electrical series by the external electronic conductor means;

piping for returning the alkali metal condensed in the respective second spatial regions of the thermoelectric converters to the respective first regions of the thermoelectric converters via a common pump; and a connection piping consisting of a plurality of connection pipes which connect the respective first spatial regions of the thermoelectric converters to one another in such a manner as to allow them to communicate with one another, the respective open ends of the connection pipes being positioned in those sections of the respective first spatial regions where only the vapor phase alkali metal exists.

2. An alkali metal thermoelectric power generator as claimed in claim 1, wherein a check valve is provided on the delivery side of the common pump.

3. An alkali metal thermoelectric power generator as claimed in one of claims 1 and 2, wherein at least a part of each of the connection pipes is formed of an electrically insulating material, thereby blocking the electrical conduction between the connection pipes.

4. An alkali metal thermoelectric power generator as claimed in claim 1, wherein the first means consists of a first wick and wherein the second means consists of a second wick.

5. An alkali metal thermoelectric power generator as claimed in one of claims 1 to 4, wherein each of the thermoelectric converters is filled with an alkali metal, the amount of alkali metal with which each thermoelectric converter is filled being not larger than the amount of alkali metal with which the first and second wicks in each thermoelectric converter are filled while the alkali metal thermoelectric power generator is operating.

6. An alkali metal thermoelectric power generator as claimed in claim 4, wherein the pores of the first wick exhibiting capillarity are smaller than those of the second wick.

7. An alkali metal thermoelectric power generator as claimed in claim 1, wherein the first spatial region is defined by airtightly joining the open end of a solid electrolyte tube, which is a tubular body with one end open, with the open end of a metal tube which is also a tubular body with one end open, the joint section between these open ends being covered with a heat insulating layer on the side of the first spatial region.

8. An alkali metal thermoelectric power generator as claimed in claim 1, wherein the surface of the porous electrode is covered with a collector net which is formed of a material having a good electrical conductivity.

9. An alkali metal thermoelectric power generator as claimed in claim 1, wherein the first shell members defining the first spatial region are tubular bodies with both ends closed, the half portion thereof on the side of one end being made of metal and the half portion thereof on the side of the other end being made of a solid electrolyte;

the second shell member which defines the second spatial region being composed of a common partition formed of a solid electrolyte and a metal surrounding wall surrounding the common partition;

each of the thermoelectric converters further comprising:

an anode which passes airtightly through the surrounding wall to be introduced into the second spatial region and which is conductively connected to the porous electrode; and a cathode which is conductively connected to the outer surface of the surrounding wall;

the anodes and the cathodes of the thermoelectric converters being connected in series to one another.

10. An alkali metal thermoelectric power generator as claimed in claim 9, wherein the anode is conductively connected to a collector net.

11. An alakli metal thermoelectric power generator as claimed in claim 9, wherein the first spatial region is defined by joining the open end of a solid electrolyte tube, which is a tubular body with one end open, airtightly with the open end of a metal tube, which is also a tubular body with one end open, the joint section between the open ends of these tubes being covered with a heat insulating layer on the side of the first spatial region.

12. An alkali metal thermoelectric power generator as claimed in claim 1, wherein the second shell member defining the second spatial region is a tubular body with both ends closed, the half section thereof on the side of one end being formed of a solid electrolyte; and wherein the first shell members defining the first spatial region is composed of a common partition formed of a solid electrolyte and a metal surrounding wall surrounding the common partition;

each of the thermoelectric converters further including:

an anode which passes airtightly through the side half section on the side of the other end of the second shell member to be introduced into the second spatial region; and a cathode which is conductively connected to the outer surface of the surrounding wall;

the anodes and the cathodes of the thermoelectric converters being connected in series to one another.

13. An alkali metal thermoelectric power generator as claimed in claim 12, wherein the anode is conductively connected to a collector net.

14. An alkali metal thermoelectric power generator as claimed in claim 1, wherein the second spatial region is defined by joining the open end of a solid electrolyte tube, which is a tubular body with one end open, airtightly with the open end of a metal tube, which is also a tubular body with one end open, the joint section between these open ends being covered with a heat insulating layer on the side of the first spatial region.

* * * * *